(12) United States Patent
Takao et al.

(10) Patent No.: US 11,891,097 B2
(45) Date of Patent: Feb. 6, 2024

(54) VEHICLE CONTROL SYSTEM, RESOURCE MANAGEMENT DEVICE, VEHICLE CONTROL METHOD, AND PROGRAM

(71) Applicant: MITSUBISHI HEAVY INDUSTRIES ENGINEERING, LTD., Kanagawa (JP)

(72) Inventors: Kenji Takao, Tokyo (JP); Noritaka Yanai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1051 days.

(21) Appl. No.: 16/633,190

(22) PCT Filed: Aug. 8, 2018

(86) PCT No.: PCT/JP2018/029776
§ 371 (c)(1),
(2) Date: Jan. 23, 2020

(87) PCT Pub. No.: WO2019/031548
PCT Pub. Date: Feb. 14, 2019

(65) Prior Publication Data
US 2021/0146976 A1   May 20, 2021

(30) Foreign Application Priority Data
Aug. 10, 2017   (JP) .................. 2017-155772

(51) Int. Cl.
*B61L 21/08*   (2006.01)
*G07C 5/08*   (2006.01)
(Continued)

(52) U.S. Cl.
CPC ............... *B61L 21/08* (2013.01); *B61L 3/006* (2013.01); *B61L 23/30* (2013.01); *B61L 27/57* (2022.01); *G07C 5/0808* (2013.01); *B61L 25/021* (2013.01)

(58) Field of Classification Search
CPC .......... B61L 21/08; B61L 3/006; B61L 23/14; B61L 23/30; B61L 27/20; B61L 27/40;
(Continued)

(56) References Cited

U.S. PATENT DOCUMENTS 11,110,944 B2 * 9/2021 Yanai ..................... G06Q 10/02
2005/0133673 A1 * 6/2005 Sugita ..................... B61L 27/40
246/167 R (Continued)

FOREIGN PATENT DOCUMENTS

JP   2003261028 A   9/2003
JP   2009006917 A   1/2009
(Continued)

OTHER PUBLICATIONS

International Search Report and Written Opinion of International Application No. PCT/JP2018/029776 dated Oct. 30, 2018; 13pp.

*Primary Examiner* — Zachary L Kuhfuss
(74) *Attorney, Agent, or Firm* — KANESAKA BERNER AND PARTNERS LLP

(57) ABSTRACT

In the present invention, a resource management device receives transmission of a reservation request for a block section to be reserved from among a plurality of block sections included in a track traveled by a vehicle on the basis of track information which indicates the plurality of block sections and the connection relationships of the block sections. In a case where the block section to be reserved, as indicated by the reservation request, has not already been reserved by a vehicle other than the vehicle that transmitted the reservation request at the point in time when such (Continued)

reservation request was received, the following is recorded in a management table: that the block section to be reserved as indicated by the reservation request and a connection boundary between that block section and another block section are objects reserved for the vehicle that transmitted the reservation request.

20 Claims, 9 Drawing Sheets

(51) Int. Cl.
   *B61L 27/57* (2022.01)
   *B61L 3/00* (2006.01)
   *B61L 23/30* (2006.01)
   *B61L 25/02* (2006.01)

(58) Field of Classification Search
   CPC ........ B61L 27/57; B61L 25/021; B61L 19/06; G07C 5/0808; B60L 15/40
   See application file for complete search history.

(56) References Cited

U.S. PATENT DOCUMENTS

| | | | |
|---|---|---|---|
| 2007/0162199 A1* | 7/2007 | Katsuta | B61L 27/20 701/19 |
| 2012/0320875 A1* | 12/2012 | Ishihara | B61L 15/0027 370/331 |
| 2013/0238175 A1* | 9/2013 | Kuroda | B61L 25/04 701/19 |
| 2014/0103166 A1* | 4/2014 | Asuka | B61L 23/24 246/4 |
| 2015/0344050 A1* | 12/2015 | Yanai | B61L 21/04 246/3 |
| 2018/0346005 A1* | 12/2018 | Yanai | B61L 15/0072 |

FOREIGN PATENT DOCUMENTS

| | | |
|---|---|---|
| JP | 2010215148 A | 9/2010 |
| JP | 2017094975 A | 6/2017 |
| WO | 2017010245 A1 | 1/2017 |
| WO | 2017090653 A1 | 6/2017 |

* cited by examiner

| BLOCK | BRANCH NUMBER | LEFT BOUNDARY | RIGHT BOUNDARY | BRANCH STATE | BRANCH REQUEST STATE | RESERVATION HOLDER | LINE PRESENCE STATE | RESERVATION STATE |
|---|---|---|---|---|---|---|---|---|
| 1T | 0 | a | b | NONE | NONE | 0001 | PRESENCE | RESERVATION COMPLETION |
| 1WT (N) | 1 | b | c | N | NONE | - | NON-PRESENCE | RESERVATION UNAVAILABLE |
| 1WT (R) | 1 | b | i | Y | NONE | 0001 | NON-PRESENCE | RESERVATION COMPLETION |
| 2T | 0 | e | f | NONE | NONE | - | NON-PRESENCE | RESERVATION AVAILABLE |
| 2WT (N) | 2 | f | g | N | Y | 0002 | NON-PRESENCE | RESERVATION AVAILABLE |
| 2WT (R) | 2 | i | g | Y | NONE | - | NON-PRESENCE | RESERVATION AVAILABLE |
| 4T | 0 | g | h | NONE | NONE | 0002 | NON-PRESENCE | RESERVATION COMPLETION |
| 3WT (N) | 3 | d | i | N | NONE | - | PRESENCE | RESERVATION UNAVAILABLE |
| 3WT (R) | 3 | j | i | Y | NONE | 0002 | PRESENCE | RESERVATION COMPLETION |
| 4WT (N) | 4 | h | k | N | NONE | - | NON-PRESENCE | RESERVATION UNAVAILABLE |
| 4WT (R) | 4 | h | j | Y | NONE | 0002 | PRESENCE | RESERVATION COMPLETION |
| - | - | - | - | - | - | - | - | - |

402:

| BLOCK BOUNDARY | RESERVATION RIGHT | RESERVATION | RESERVATION HOLDER |
|---|---|---|---|
| a | NONE | N | NONE |
| b | NONE | Y | 0001 |
| c | NONE | N | NONE |
| d | NONE | N | NONE |
| e | NONE | N | NONE |
| f | NONE | Y | NONE |
| g | NONE | Y | 0002 |
| h | NONE | Y | 0002 |
| i | NONE | Y | 0001 |
| j | NONE | Y | 0002 |
| k | INTERLOCKING B | N | NONE |
| - | INTERLOCKING B | N | NONE |

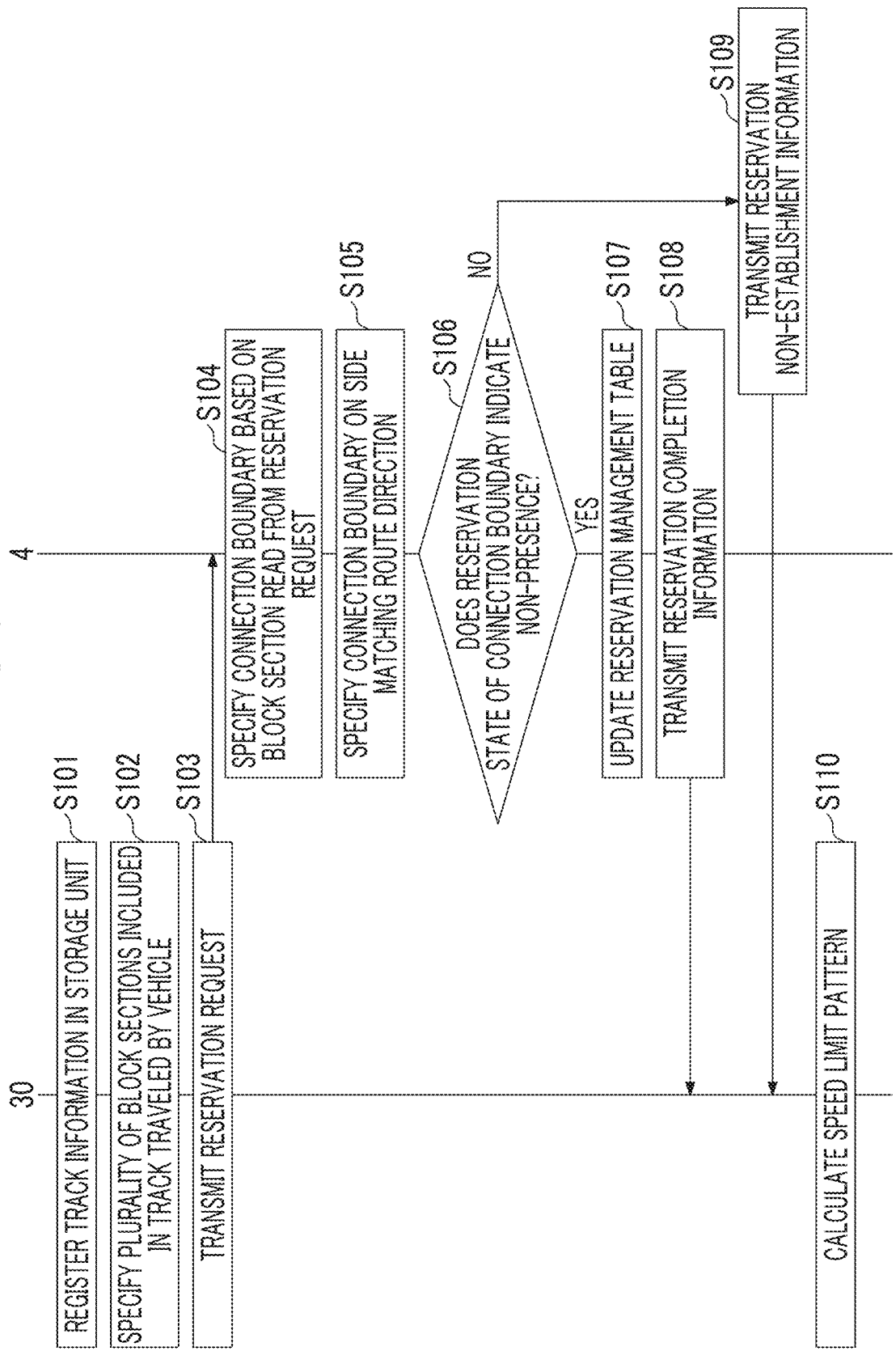

FIG. 9

<VEHICLE MANAGEMENT TABLE>

| VEHICLE IDENTIFICATION INFORMATION | COMMUNICATION STATE | CONNECTION STATE | STATE CONFIRMATION FLAG |
|---|---|---|---|
| 0001 | ... | ... | ... |
| 0002 | ... | ... | ... |
| 0003 | ... | ... | ... |
| ... | ... | ... | ... |
| ... | ... | ... | ... |

US 11,891,097 B2

VEHICLE CONTROL SYSTEM, RESOURCE MANAGEMENT DEVICE, VEHICLE CONTROL METHOD, AND PROGRAM

RELATED APPLICATIONS

The present application is a National Phase of International Application Number PCT/JP2018/029776 filed Aug. 8, 2018 and claims priority of Japanese Application Number 2017-155772 filed Aug. 10, 2017.

TECHNICAL FIELD

The present invention relates to a vehicle control system, a resource management apparatus, a vehicle control method, and a program.

The present application claims benefit of priority based on Japanese Patent Application No. 2017-155772 filed on Aug. 10, 2017, the content of which is incorporated herein by reference.

BACKGROUND ART

A track-based traffic system (hereinafter, a railroad system) performing high density operation includes an automatic train protection (ATP) device for safely maintaining the speed of a train. In the railroad system including the ATP device, an interlocking device in the related art performs control for switching a point machine present at a branch of a track. The interlocking device performs exclusive control between vehicles in units of routes (block sections). The interlocking device performs control for switching the point machine while securing safety. In such a railroad system, the interlocking device and the ATP device are installed on the ground side. These machines of the interlocking device and the ATP device are expensive and require preparation of a large machine room. The interlocking device operates based on a logic table called an "interlocking table" created by a signal technician having special skills. However, the creation of the logic table requires the signal technician having special skills. In addition, in the creation of the logic table, not only a cost related to initial design is incurred, but also a high cost is incurred in maintenance.

As a technology for resolving such a problem, a technology for traveling control of a vehicle traveling on a track without creating an interlocking table requiring high level technology is disclosed (refer to PTL 1).

CITATION LIST

Patent Literature

[PTL 1] Japanese Unexamined Patent Application Publication No. 2017-94975

SUMMARY OF INVENTION

Technical Problem

In the case of controlling the vehicle traveling on the track, the railroad system is desired to be capable of performing control for setting a block section not reservable by vehicles at the same time between block sections respectively reserved by vehicles traveling in opposition, and perform control for preventing an interval as far as possible between vehicles traveling at an interval in the same direction. A technology enabling control for setting the block section not reservable by vehicles at the same time between the block sections respectively reserved by the vehicles traveling in opposition and control for preventing an interval as far as possible between the vehicles traveling at an interval in the same direction without creating the interlocking table requiring high level technology is needed.

Therefore, an object of the invention is to provide a vehicle control system, a resource management device, a vehicle control method, and a program for resolving the above problem.

Solution to Problem

According to a first aspect of the present invention, a vehicle control system includes a traveling management device including a reservation request unit that transmits a reservation request for a block section of a reservation target to a resource management device among a plurality of block sections included in a track traveled by a vehicle based on track information indicating the plurality of block sections constituting the track of the vehicle and a connection relationship between the block sections, and the resource management device including a reservation management unit that records the block section of the reservation target indicated by the reservation request and a connection boundary between the block section and another block section in a first reservation management table as a reserved target of the vehicle transmitting the reservation request in a case where the block section of the reservation target indicated by the reservation request is not reserved by a vehicle other than the vehicle transmitting the reservation request at a time of reception of the reservation request.

In the vehicle control system, in a case where the connection boundary is recorded in the first reservation management table as the reserved target, the reservation management unit of the resource management device may reject the reservation request for a block section having the connection boundary.

In the vehicle control system, in a case where a connection boundary that is positioned in an advancing direction of the vehicle between connection boundaries at both ends of the block section of the reservation request from the vehicle is recorded in the first reservation management table as the reserved target, the reservation management unit of the resource management device may reject the reservation request for a block section having the connection boundary.

In the vehicle control system, the resource management device may include a first resource management device that performs reservation management of the block section using the first reservation management table, and a second resource management device that records the block section of the reservation target indicated by the reservation request in a second reservation management table as the reserved target of the vehicle transmitting the reservation request without recording the connection boundary disposed in the block section of the reservation target indicated by the reservation request as the reserved target and performs reservation management of the block section using the second reservation management table in a case where the block section of the reservation target indicated by the reservation request is not reserved by the vehicle other than the vehicle transmitting the reservation request at the time of reception of the reservation request, and the reservation request unit of the traveling management device may transmit the reservation request to any of the first resource management device or the second resource management device disposed in correspondence with a position of the vehicle traveling on the track.

In the vehicle control system, the first resource management device may perform a process based on a reservation request for each block section installed in a first management area, and the second resource management device may perform a process based on a reservation request for each block section installed in a second management area.

In the vehicle control system, the reservation management table may store identification information of the block section in association with a reservation state of the block section, the resource management device may include a malfunction detection unit that detects a malfunction of the vehicle, and in a case where the malfunction of the vehicle is detected, the reservation management unit of the resource management device may update the reservation state of the block section reserved by the vehicle to a train malfunction and delete a recording of the reservation management table for the connection boundary as the reserved target.

In the vehicle control system, the resource management device may record a block section reserved by the vehicle having the detected malfunction in the reservation management table as a block section of a reserved target reserved by a rescue vehicle connected to a malfunctioning vehicle.

According to a second aspect of the present invention, a resource management device is a resource management device included in a vehicle control system and includes a reservation management unit that makes communication connection to a traveling management device including a reservation request unit that transmits a reservation request for a block section of a reservation target to a resource management device among a plurality of block sections included in a track traveled by a vehicle based on track information indicating the plurality of block sections constituting the track of the vehicle and a connection relationship between the block sections, and records the block section of the reservation target indicated by the reservation request and a connection boundary between the block section and another block section in a first reservation management table as a reserved target of the vehicle transmitting the reservation request in a case where the block section of the reservation target indicated by the reservation request is not reserved by a vehicle other than the vehicle transmitting the reservation request at a time of reception of the reservation request.

In the resource management device, in a case where a connection boundary that is positioned in an advancing direction of the vehicle between connection boundaries at both ends of the block section of the reservation request from the vehicle is recorded in the first reservation management table as the reserved target, the reservation management unit may reject the reservation request for a block section having the connection boundary.

In the resource management device, the reservation management table may store identification information of the block section in association with a reservation state of the block section, a malfunction detection unit that detects a malfunction of the vehicle may be included, and in a case where the malfunction of the vehicle is detected, the reservation management unit of the resource management device may update the reservation state of the block section reserved by the vehicle to a train malfunction and delete a recording of the reservation management table for the connection boundary as the reserved target.

In the resource management device, the reservation management unit may record a block section reserved by the vehicle having the detected malfunction in the reservation management table as a block section of a reserved target reserved by a rescue vehicle connected to a malfunctioning vehicle.

According to a third aspect of the present invention, a vehicle control method includes making communication connection to a traveling management device including a reservation request unit that transmits a reservation request for a block section of a reservation target to a resource management device among a plurality of block sections included in a track traveled by a vehicle based on track information indicating the plurality of block sections constituting the track of the vehicle and a connection relationship between the block sections, and recording the block section of the reservation target indicated by the reservation request and a connection boundary between the block section and another block section in a first reservation management table as a reserved target of the vehicle transmitting the reservation request in a case where the block section of the reservation target indicated by the reservation request is not reserved by a vehicle other than the vehicle transmitting the reservation request at a time of reception of the reservation request.

In the vehicle control method, in a case where a connection boundary that is positioned in an advancing direction of the vehicle between connection boundaries at both ends of the block section of the reservation request from the vehicle is recorded in the first reservation management table as the reserved target, the reservation request for a block section having the connection boundary may be rejected.

In the vehicle control method, the reservation management table may store identification information of the block section in association with a reservation state of the block section, a malfunction of the vehicle may be detected, and in a case where the malfunction of the vehicle is detected, the resource management device may update the reservation state of the block section reserved by the vehicle to a train malfunction and delete a recording of the reservation management table for the connection boundary as the reserved target.

In the vehicle control method, a block section reserved by the vehicle having the detected malfunction may be recorded in the reservation management table as a block section of a reserved target reserved by a rescue vehicle connected to a malfunctioning vehicle.

In the vehicle control method, the traveling management device may transmit the reservation request for the block section of the reservation target to the resource management device among the plurality of block sections included in the track traveled by the vehicle based on the track information indicating the plurality of block sections constituting the track of the vehicle and a connection relationship between the block sections, and the resource management device may record the block section of the reservation target indicated by the reservation request and the connection boundary between the block section and the other block section in the first reservation management table as the reserved target of the vehicle transmitting the reservation request in a case where the block section of the reservation target indicated by the reservation request is not reserved by the vehicle other than the vehicle transmitting the reservation request at the time of reception of the reservation request.

According to a fourth aspect of the present invention, a program causes a computer of a resource management device included in a vehicle control system to function as means for making communication connection to a traveling management device including a reservation request unit that transmits a reservation request for a block section of a reservation target to a resource management device among a plurality of block sections included in a track traveled by a vehicle based on track information indicating the plurality of block sections constituting the track of the vehicle and a connection relationship between the block sections, and means for recording the block section of the reservation target indicated by the reservation request and a connection boundary between the block section and another block section in a first reservation management table as a reserved target of the vehicle transmitting the reservation request in a case where the block section of the reservation target indicated by the reservation request is not reserved by a vehicle other than the vehicle transmitting the reservation request at a time of reception of the reservation request.

The program may further cause the computer of the resource management device included in the vehicle control system to function as means for rejecting the reservation request for a block section having the connection boundary in a case where a connection boundary that is positioned in an advancing direction of the vehicle between connection boundaries at both ends of the block section of the reservation request from the vehicle is recorded in the first reservation management table as the reserved target.

The program may further cause the computer of the resource management device included in the vehicle control system to function as means for detecting a malfunction of the vehicle, and means for updating the reservation state of the block section reserved by the vehicle to a train malfunction and deleting a recording of the reservation management table for the connection boundary as the reserved target in a case where the malfunction of the vehicle is detected.

The program may further cause the computer of the resource management device included in the vehicle control system to function as means for recording a block section reserved by the vehicle having the detected malfunction as a block section of a reserved target reserved by a rescue vehicle connected to a malfunctioning vehicle.

Advantageous Effects of Invention

The vehicle control system of the present invention can easily perform control for setting a block section not reservable by vehicles at the same time between block sections respectively reserved by vehicles traveling in opposition, and perform control for preventing an interval as far as possible between vehicles traveling at an interval in the same direction. Accordingly, an accident can be avoided by always disposing a block section for vehicles in opposition. High operation efficiency control can be performed without disposing a block section for the vehicle advancing in the same direction.

BRIEF DESCRIPTION OF DRAWINGS

FIG. 4 is a diagram illustrating a reservation management table stored in the resource management device.

FIG. 5 is a diagram illustrating a process flow of the vehicle control system according to a first embodiment.

FIG. 9 is a diagram illustrating a vehicle management table.

DESCRIPTION OF EMBODIMENTS

Hereinafter, a vehicle control system according to one embodiment of the present invention will be described with reference to the drawings.

Figure 1:
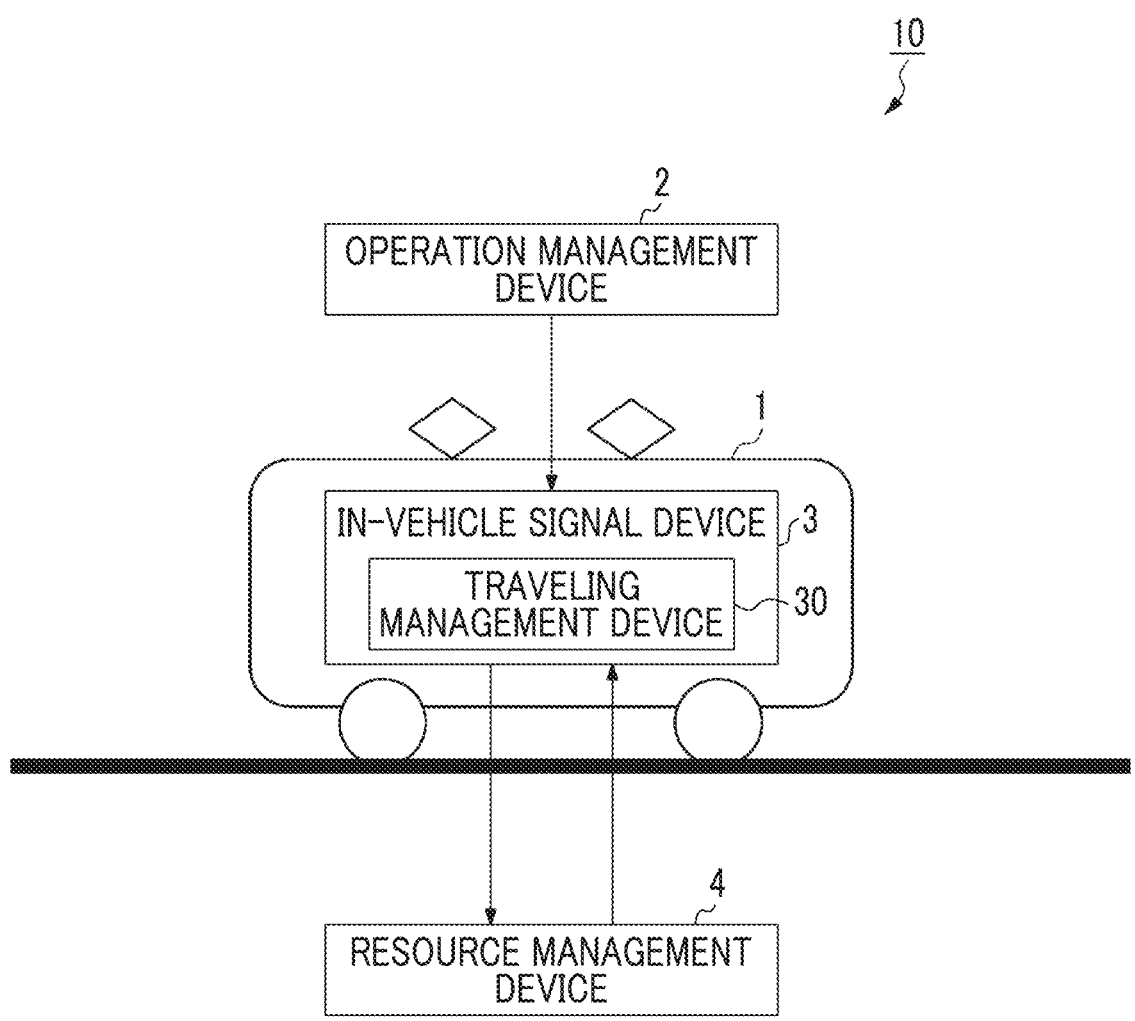
FIG. 1 is a diagram illustrating a configuration of a vehicle control system.

FIG. 1 is a diagram illustrating a configuration of the vehicle control system according to one embodiment of the present invention.

FIG. 1 illustrates a vehicle control system 10. As illustrated in FIG. 1, the vehicle control system 10 includes an operation management device 2, an in-vehicle signal device 3 mounted in a vehicle 1, and a resource management device 4. The operation management device 2 and the in-vehicle signal device 3 are connected by wireless signaling. The operation management device 2 outputs information for operation to the in-vehicle signal device 3. The in-vehicle signal device 3 includes a traveling management device 30. The in-vehicle signal device 3 and the resource management device 4 are connected by wireless signaling. The vehicle 1 travels on a track. The track is configured with a plurality of block sections. The traveling management device 30 of the in-vehicle signal device 3 transmits and receives information with the resource management device 4 in order to perform reservation management of each block section that is a resource.

More specifically, the traveling management device 30 specifies a plurality of block sections included in the track traveled by the vehicle 1 based on track information that indicates the plurality of block sections constituting the track of the vehicle 1 and a connection relationship between the block sections. Among the specified plurality of block sections, the traveling management device 30 specifies a block section as a reservation target that is positioned ahead of a block section in which the vehicle is currently present. The traveling management device 30 transmits a reservation request indicating the block section of the reservation target to the resource management device 4. The resource management device 4 determines whether at the time of reception of the reservation request, the block section of the reservation target indicated by the reservation request and a connection boundary between the block section and another block section are reserved by a vehicle other than the vehicle 1 transmitting the reservation request, a malfunctioning vehicle is present in the block section of the reservation target, or an on-ground device of the block section of the reservation target is malfunctioning. In a case where the block section of the reservation target is not reserved by a vehicle other than the vehicle 1, a malfunctioning vehicle is not present in the block section of the reservation target, and the on-ground device of the block section of the reservation target is not malfunctioning, the resource management device 4 specifies the block section of the reservation target indicated by the reservation request and the connection boundary between the block section and the other block section. The resource management device 4 records the specified block section and the connection boundary in a reservation management table as a reserved target of the vehicle transmitting the reservation request. At this point, in a case where the specified connection boundary is already recorded in the reservation management table as the reserved target, the resource management device 4 rejects the reservation request for the block section having the connection boundary from the traveling management device 30.

Figure 2:
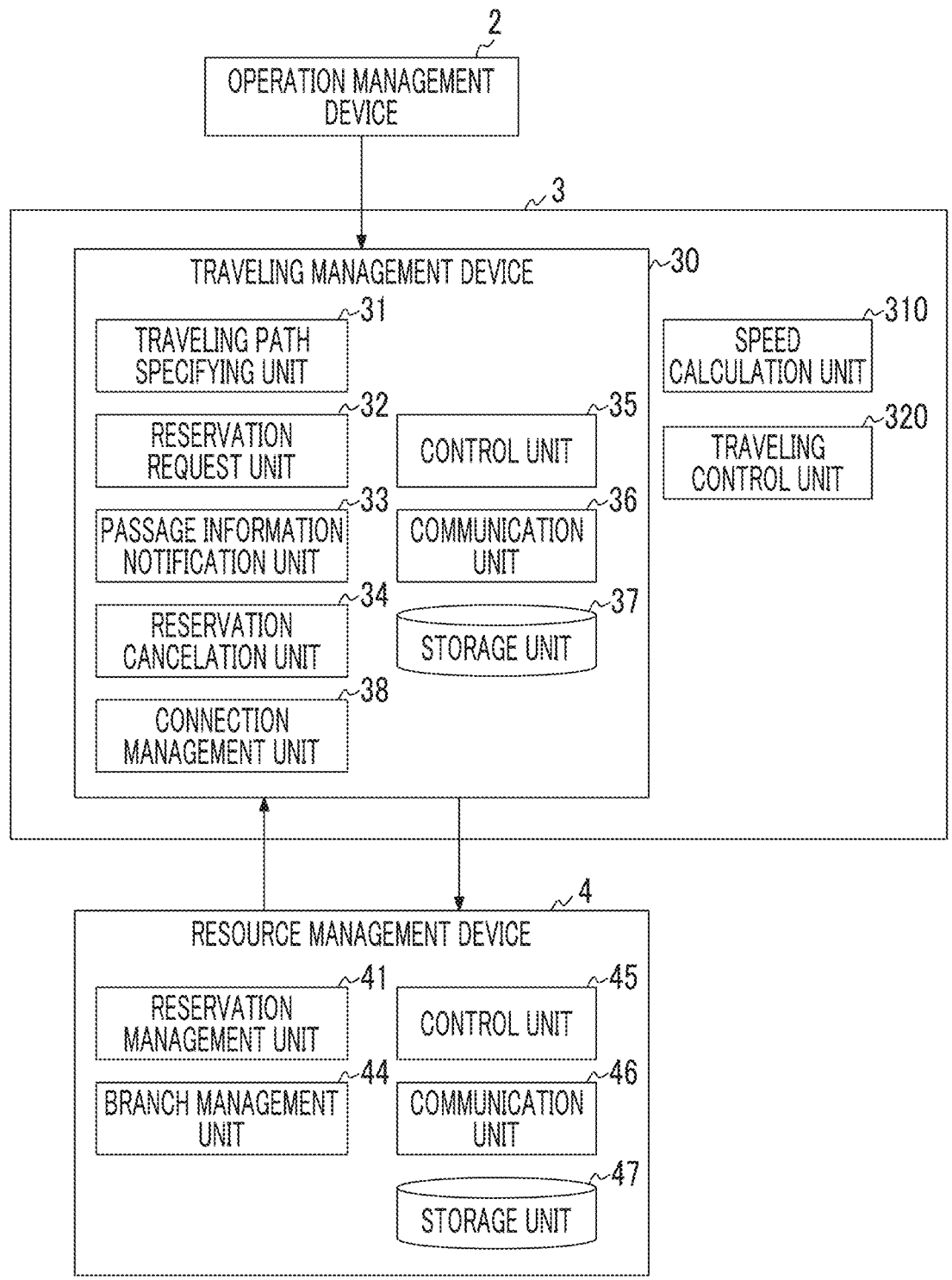
FIG. 2 is a function block diagram of an in-vehicle signal device, a traveling management device, and a resource management device.

FIG. 2 is a function block diagram of the in-vehicle signal device, the traveling management device, and the resource management device according to one embodiment of the present invention.

The in-vehicle signal device 3 includes processing units of a speed calculation unit 310 and a traveling control unit 320 in addition to the traveling management device 30.

The traveling management device 30 includes processing units of a traveling path specifying unit 31, a reservation request unit 32, a passage information notification unit 33, a reservation cancelation unit 34, a control unit 35, a communication unit 36, and a connection management unit 38, and a storage unit 37.

The resource management device 4 includes processing units of a reservation management unit 41, a branch management unit 44, a control unit 45, and a communication unit 46, and a storage unit 47.

The traveling path specifying unit 31 of the traveling management device 30 specifies one or a plurality of block sections included in the track traveled by the vehicle 1 based on the track information indicating the plurality of block sections and the connection relationship between the block sections.

The reservation request unit 32 specifies the block section as the reservation target positioned ahead of the block section in which the vehicle 1 is currently present among the plurality of block sections specified by the traveling path specifying unit 31. The reservation request unit 32 transmits the reservation request for the block section of the reservation target to the resource management device 4.

The reservation management unit 41 of the resource management device 4 determines whether or not at the time of reception of the reservation request, one or a plurality of block sections of the reservation target indicated by the reservation request and the connection boundaries between the block sections and other block sections are reserved by a vehicle other than the vehicle 1 transmitting the reservation request. In a case where the reservation management unit 41 determines that the block sections and the connection boundary are not reserved by a vehicle other than the vehicle 1, the reservation management unit 41 records the one or the plurality of block sections of the reservation target indicated by the reservation request and the connection boundaries between the block sections and the other block sections in the reservation management table as the reserved target of the vehicle 1 transmitting the reservation request. In a case where the connection boundaries are already recorded in the reservation management table as the reserved target of another vehicle, the reservation management unit 41 rejects the reservation request for the block sections having the connection boundaries from the traveling management device 30.

The speed calculation unit 310 of the in-vehicle signal device 3 calculates a speed limit pattern in each block section up to a block section indicated in reservation completion information.

The traveling control unit 320 of the in-vehicle signal device 3 performs stoppage control of a brake and the like based on the speed limit pattern and a signal from a higher device.

The passage information notification unit 33 of the traveling management device 30 transmits a passed block section of the vehicle 1 to the resource management device 4.

In a case where the reservation cancelation unit 34 of the traveling management device 30 acquires a cancelation request for the reserved block section from the higher device, the reservation cancelation unit 34 performs stoppage control of the vehicle 1. After the stoppage of the vehicle, the reservation cancelation unit 34 transmits a reservation cancelation of the block section that is present ahead in an advancing direction among the reserved block sections to the resource management device 4.

The control unit 35 of the traveling management device 30 controls other function units.

The communication unit 36 of the traveling management device 30 communicates with other devices.

The connection management unit 38 of the traveling management device 30 performs a process for connecting vehicles.

In a case where a block section having a branch is present among the reserved block sections of the vehicle, the branch management unit 44 of the resource management device 4 performs switching control of the branch (point machine) for the vehicle based on a traveling direction.

In the resource management device 4, the control unit 45 controls each processing unit in the device.

The communication unit 46 of the resource management device 4 communicates with other devices such as the in-vehicle signal device 3.

The storage unit 47 stores information for resource management. For example, the storage unit 47 stores a resource management table.

Figure 3:
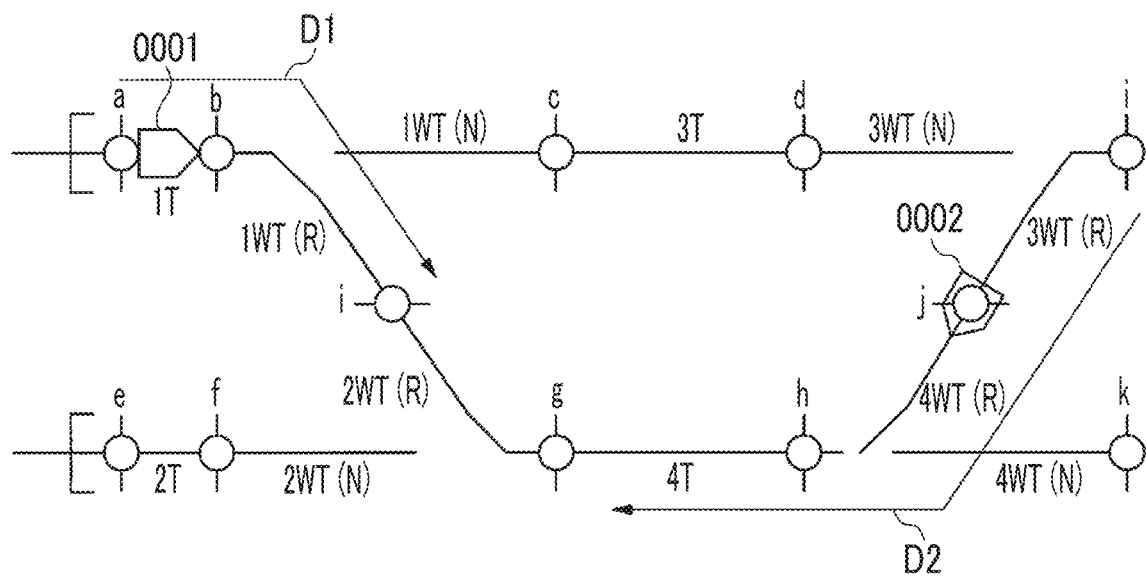
FIG. 3 is a diagram illustrating each block section constituting a track of a vehicle.

FIG. 3 is a diagram illustrating each block section constituting the track of the vehicle.

The track illustrated in FIG. 3 is a track that is configured by connecting block sections represented by identification information 1T, 1WT(N), 1WT(R), 2T, 2WT(N), 2WT(R), 3T, 4T, 3WT(N), 3WT(R), 4WT(N), and 4WT(R). The track illustrated in FIG. 3 has a branch. In the block section having the branch, the identification information of a block section in which the point machine is used in a state where the point machine is set to a position on a normal position side is represented with "N". In the block section having the branch, the identification information of a block section in which the point machine is used in a state where the point machine is set to a position on a reverse position side is represented with "R". For example, in the block section 1WT, in a case where the point machine is controlled to be positioned on the normal position side, the identification information of the block section is represented by 1WT(N). In the block section 1WT, in a case where the point machine is controlled to be positioned on the reverse position side, the identification information of the block section is represented by 1WT(R).

Specifically describing the connection relationship between the block sections of the track illustrated in FIG. 3, first, a block section 1T is connected to the block sections 1WT(N) and 1WT(R). A connection boundary a is disposed in the end portion of the block section 1T in the leftward direction of the drawing. A connection boundary b is disposed in the other end portion in the rightward direction of the drawing. The block section 1T is connected to the block section 1WT(N) and the block section 1WT(R) at the connection boundary b. The block section 1WT(N) has the connection boundary b on the block section 1T side and has a connection boundary c in the other end portion different from the connection boundary b. The block section 1WT(N)

is connected to the block section 3T at the connection boundary c. The block section 3T has the connection boundary c on the block section 1WT(N) side and has a connection boundary d in the other end portion different from the connection boundary c. The block section 3T is connected to the block section 3WT(N) at the connection boundary d. The block section 3WT(N) has the connection boundary d on the block section 3T side and has a connection boundary i in the other end portion different from the connection boundary d.

The block section 3WT(R) has the connection boundary i at one end and is connected to the block section 4WT(R) at a connection boundary j at the other end. The block section 4WT(R) has the connection boundary j on the block section 3WT(R) side and has a connection boundary h in the other end portion different from the connection boundary j. The block section 4WT(R) is connected to the block section 4T at the connection boundary h. The block section 4WT(N) is also connected to the connection boundary h. The block section 4WT(N) has the connection boundary h on the block section 4T side and has a connection boundary k in the other end portion different from the connection boundary h.

The block section 4T has the connection boundary h on the block section 4WT(R) side and the block section 4WT(N) side, and has a connection boundary g in the other end portion different from the connection boundary h. The block section 4T is connected to the block section 2WT(R) and the block section 2WT(N) at the connection boundary g. The block section 2WT(N) has the connection boundary g on the block section 4T side and has a connection boundary f in the other end portion different from the connection boundary g. The block section 2WT(N) is connected to the block section 2T at the connection boundary f. The block section 2T has the connection boundary f on the block section 2WT(N) side and has a connection boundary e at the other end different from the connection boundary f. The block section 2WT(R) has the connection boundary g on the block section 4T side and has a connection boundary i at the other end different from the connection boundary g. The block section 2WT(R) is connected to the block section 1WT(R) at the connection boundary i. The block section 1WT(R) has the connection boundary i on the block section 2WT(R) side and has the connection boundary b at the other end different from the connection boundary i. The block section 1WT(R) is connected to the block section 1T at the connection boundary b. The connection relationship between the block sections of the track illustrated in FIG. 3 is described thus far.

In FIG. 3, it is represented that a vehicle 0001 is present in the block section 1T. In FIG. 3, it is illustrated that the vehicle 0001 is on a route D1. The route D1 includes the block sections 1T and 1WT(R) in this order in a route direction. In FIG. 3, it is represented that a vehicle 0002 is present between the block sections 3WT(R) and 4WT(R). The vehicle 0002 is on a route D2. The route D2 includes the block sections 3WT(R), 4WT(R), 4T, ... in this order in the route direction.

As illustrated in FIG. 3, the vehicle 0001 and the vehicle 0002 have opposite route directions. In such a case, the resource management device 4 performs control such that block sections reservable by the vehicle 0001 and the vehicle 0002 in opposition are separated by one section from each other. That is, in the track illustrated in FIG. 3, the resource management device 4 performs control such that the block section 2WT(R) cannot be reserved by any of the vehicle 0001 and the vehicle 0002 having opposite route directions. More specifically, based on the reservation request, the resource management device 4 assigns the connection boundary between the block section specified by the reservation request and another block section other than the reservation target to the vehicle making the reservation request in order of earliest reservation request. The resource management device 4 performs control for locking the other block section connected to the connection boundary assigned to the vehicle and not assigning the connection boundary to another vehicle. Accordingly, in the situation illustrated in FIG. 3, the resource management device 4 assigns the vehicle 0001 to the connection boundary i based on the reservation request and assigns the connection boundary g to the vehicle 0002 based on the reservation request from the vehicle 0002 traveling in opposition to the vehicle 0001. However, since the block section 2WT(R) is a block section having the connection boundary i, the resource management device 4 performs control for locking the assignment of the block section 2WT(R) to the vehicle 0002. In addition, even in a case where the reservation request for the block section 2WT(R) is made from the vehicle 0001, control for locking the assignment of the block section 2WT(R) to the vehicle 0001 is performed since the connection boundary g of the block section 2WT(R) in the route direction of the vehicle 0001 is assigned to the vehicle 0002. Accordingly, since both vehicles cannot reserve the connection boundary ahead in the route direction, the block section 2WT(R) can be unoccupied as a block section of an opposition protection target. Accordingly, vehicles traveling in opposition can be protected (opposition protection).

In the block section 2WT(N), the connection boundary f that is on the route direction side of the vehicle 0002 between the connection boundaries g and f of the block section 2WT(N) is not reserved by another vehicle. Thus, the vehicle 0002 can reserve the block section 2WT(N). Accordingly, smooth operation management can be performed.

FIG. 4 is a diagram illustrating the reservation management table stored in the resource management device.

The resource management device 4 creates and registers two reservation management tables of a block section reservation management table 401 and a connection boundary reservation management table 402 in the storage unit 37. The resource management device 4 can update the contents of the block section reservation management table 401 and the connection boundary reservation management table 402.

As illustrated in FIG. 4, the block section reservation management table 401 is a data table storing the identification information of the block section, a branch number, identification information of a first connection boundary (a connection boundary on the left side of each block section illustrated in FIG. 3), identification information of a second connection boundary (a connection boundary on the right side of each block section illustrated in FIG. 3), a branch state, a branch request state, reservation holder identification information, a line presence state, and a reservation state in association.

The first connection boundary and the second connection boundary indicate two connection boundaries that are present in one block section and can be connected to other block sections. The identification information of the first connection boundary and the second connection boundary may be shared between other block sections in the connection relationship.

The branch state is information indicating whether the point machine in the block section having the branch is changed from the normal position side (N) to the reverse position side (R) (Y) or not changed (N), or the branch is not present (none). The branch request state is information indicating whether a request for changing from the normal position side to the reverse position side is made (Y) or not (none) for the block section having the branch among block sections desired to be reserved by vehicles.

The reservation holder identification information is information storing identification information of a reservation source (a vehicle, a control center, a station, or the like) that reserves the block section.

In the block section reservation management table 401, the reservation state is information indicating the current reservation state (reservation available, reservation unavailable, reservation completion, and the like) of the block section. The reservation state "reservation available" indicates a situation where reservation is not made by a vehicle. The resource management device 4 mainly performs a process of updating the information of the block section reservation management table 401.

The connection boundary reservation management table 402 stores the reservation state (presence "Y" and non-presence "N"), the reservation holder identification information, and the like in association with identification information of the connection boundary. The resource management device 4 performs a process of updating the information of the connection boundary reservation management table 402 based on the reservation request.

The resource management device 4 further stores data of track information indicating the identification information of each block section, the identification information of the first connection boundary and the identification information of the second connection boundary, and the connection relationship between the block sections in the storage unit 47.

First Embodiment

FIG. 5 is a diagram illustrating a process flow of the vehicle control system according to a first embodiment.

Next, the process flow of the vehicle control system 10 will be described.

In the description of the process flow of the vehicle control system 10, it is assumed that on the track configured with each block section illustrated in FIG. 3, the vehicle 0001 advances in the route direction D1, and the vehicle 0002 advances in the route direction D2. Accordingly, the vehicle 0001 and the vehicle 0002 have opposite route directions.

In the vehicle control system 10, first, the operation management device 2 transmits the track information including the information of the block sections included in the track and the connection relationship to the in-vehicle signal devices 3 mounted in the vehicle 0001 and the vehicle 0002 through wireless communication. In the track information, an operation manager may indicate each block section of the track desired to be traveled by the vehicle 0001 and the vehicle 0002. Hereinafter, the process flow of each device included in the vehicle 0001 will be described. The same applies to the process flow of each device included in the vehicle 0002. The in-vehicle signal device 3 of the vehicle 0001 outputs the track information to the traveling management device 30. The communication unit 36 of the traveling management device 30 acquires the track information. The control unit 35 registers the track information acquired by the communication unit 36 in the storage unit 37 (step S101).

In this state, the traveling path specifying unit 31 of the traveling management device 30 reads the track information from the storage unit 37. The traveling path specifying unit 31 specifies a plurality of block sections included in the track traveled by the vehicle 0001 based on the track information (step S102). The track information may be information including the identification information of the block sections constituting the track that is already decided in advance to be traveled by the vehicle 0001. Alternatively, the track information may be information including the identification information of the block sections constituting each track of a plurality of paths randomly selectable by the vehicle 0001. In a case where a plurality of paths connecting a specific starting point to a specific end point can be randomly selected based on the identification information of the plurality of block sections included in the track information, the traveling path specifying unit 31 may specify the block sections included in the track of a path that is specified using a predetermined path selection algorithm (graph theory, path search technology, or the like). The traveling path specifying unit 31 outputs the specified block sections to the reservation request unit 32. The reservation request unit 32 specifies information of the acquired block sections as information of the block sections of the reservation target. The reservation request unit 32 transmits the reservation request including the identification information of the block sections of the reservation target to the resource management device 4 through wireless communication (step S103). The reservation request may include the identification information of the block section (block section 1T) in which the vehicle 0001 is currently positioned. The reservation request unit 32 determines whether or not a branch is present in the block sections included in the reservation request from information that is synchronized with the reservation management table recorded in the storage unit 37. In a case where a branch is present, the reservation request unit 32 stores the branch request state indicating whether the point machine is to be set to the normal position side (N) or the reverse position side (R) in the reservation request.

The reservation management unit 41 of the resource management device 4 receives the reservation request. The reservation management unit 41 reads the identification information of the block sections included in the reservation request. Based on the identification information of the block sections read from the reservation request, the reservation management unit 41 specifies identification information of two connection boundaries disposed in the block sections from the block section reservation management table (step S104). For example, it is assumed that the reservation management unit 41 detects the block section 1WT(R) included in the reservation request received from the vehicle 0001. In this case, the reservation management unit 41 specifies the connection boundaries b and i at both ends of the block section 1WT(R).

The reservation management unit 41 specifies the connection boundary that is on a side matching the advancing direction of the route direction D1 between the connection boundaries b and i of the block section 1WT(R) (step S105). The reservation management unit 41 reads the reservation state recorded in the connection boundary reservation management table 402 in correspondence with the connection boundary i. The reservation management unit 41 determines whether the reservation state of the connection boundary i indicates non-presence (N), a malfunctioning vehicle is present on the line in the block sections included in the reservation request, or the on-ground devices corresponding to the block sections are malfunctioning (step S106). In a case where the reservation state of the connection boundary i indicates non-presence (N), the reservation management unit 41 reads the reservation state of the block section 1WT(R) from the block section reservation management table 401 and checks that reservation is available in a case where it is determined that a malfunctioning vehicle is not present on the line in the block section 1WT(R) included in the reservation request and the on-ground device corresponding to the block section 1WT(R) is not malfunctioning. In a case where the reservation state of the connection boundary i indicates N and the reservation state of the block section 1WT(R) indicates reservation available, the reservation management unit 41 updates the block section reservation management table 401 and the connection boundary reservation management table 402 such that the reservation holder identification information corresponding to those information is set with the information of the vehicle 0001 (step S107).

In a case where the reservation state of the connection boundary indicates presence (Y), the reservation management unit 41 discards the reservation request for the block section 1WT(R) having the connection boundary i at another end. The reservation management unit 41 determines whether or not all of the block sections included in the reservation request and the connection boundaries can be reserved using the same process in order in accordance with the route direction. When reservation is available, the reservation management unit 41 reserves the block section and the connection boundary of the block section on the advancing direction side of the route direction and finishes processing. After the completion of the reservation, the reservation management unit 41 transmits, to the in-vehicle signal device 3 of the vehicle 0001, the reservation completion information in which the reservation holder identification information is updated to the vehicle 0001 and that includes the identification information of each block section and the identification information of the connection boundaries (step S108). In a case where the reservation is canceled, the reservation management unit 41 transmits information indicating non-establishment of reservation indicating the identification information of all or a part of the block sections included in the reservation request to the in-vehicle signal device 3 of the vehicle 0001 (step S109).

In a case where the in-vehicle signal device 3 receives the reservation completion information, the in-vehicle signal device 3 outputs the reservation completion information to the traveling management device 30. The traveling management device 30 records the reservation completion information in the storage unit 37. The reservation completion information may include other information recorded in a reservation management table 71 in association with the reservation holder identification information of the vehicle 0001. Thus, the reservation completion information may include information related to the block section reserved by the vehicle 0001 in the reservation management table 71. The speed calculation unit 310 of the in-vehicle signal device 3 acquires the reserved (reservation completion) block section of the vehicle 1 based on the reservation completion information recorded in the storage unit 37. The speed calculation unit 310 calculates the speed limit pattern in the reserved block section (step S110). A calculation method for the speed limit pattern varies and is not limited. For example, the speed calculation unit 310 may acquire the speed limit of each block section by communicating with an ATP device disposed on the ground aside the track, and calculate the speed limit pattern in each block section (the limit value of a speed in each block section) based on the speed limit. The speed limit pattern may be calculated depending on a distance to the frontmost reserved block section in the traveling direction. Based on the speed limit pattern, the traveling control unit 320 of the in-vehicle signal device 3 controls the speed of the vehicle 1 to not exceed the speed limit pattern. The speed calculation unit 310 may calculate the speed limit pattern using gradient information acquired from the ATP device. The speed calculation unit 310 may calculate the speed limit pattern based on information that is acquired from the operation management device 2 through wireless communication.

According to the process thus far, the traveling management device 30 of the vehicle 0001 can reserve each block section and the connection boundaries in the route direction D1 of the vehicle 0001.

It is assumed that in a state where the vehicle 0001 reserves the block section 1WT(R) and the connection boundary i ahead of the vehicle 0002 as described above, the traveling management device 30 of the vehicle 0002 also transmits the reservation request including the block section 2WT(R) to the resource management device 4. In this case, the same process as described above is performed. However, the connection boundary i of the block section 2WT(R) on the advancing direction side of the route direction D2 of the vehicle 0002 is already reserved by the vehicle 0001. Accordingly, in a case where the resource management device 4 performs the process of step S106 based on the reservation request from the vehicle 0002, the connection boundary i is in the reservation state presence (Y) (No in step S106). Then, the resource management device discards the reservation request. Accordingly, the traveling management device 30 included in the vehicle 0002 cannot reserve the block section 2WT(R). Meanwhile, the traveling management device 30 of the vehicle 0002 can reserve the block section 4T and up to the connection boundary g present ahead in the route direction D2 in a case where the block section 4T and the connection boundary g are not reserved by the vehicle 0001. That is, according to the above process, in a case where the connection boundary is reserved by the traveling management device 30 of another vehicle, the traveling management device 30 of the vehicle 0002 cannot reserve the block section having the connection boundary at one end. Accordingly, block sections reservable by vehicles having opposite route directions are always separated by one block section. Thus, the opposition protection can be performed by the processes of the traveling management device 30 and the resource management device 4. The resource management device 4 may control reservation of the block sections such that block sections reservable by vehicles having opposite route directions are separated by one or more block sections.

In addition, by immediately releasing the reservation of the passed block section and the connection boundaries included in the block section based on the position of the vehicle and enabling another vehicle traveling at an interval in the same direction to make a reservation, the resource management device 4 performs control such that an interval is not present between the vehicles as far as possible. Accordingly, an accident can be avoided by always disposing a block section that cannot be reserved by vehicles in opposition to each other. High operation efficiency control can be performed without disposing a block section for the vehicle advancing in the same direction.

In the above process, in a case where the block section 2WT(R) cannot be reserved, the traveling management device 30 of the vehicle 0002 performs control for reserving the block section 2WT(N) and temporarily moving the vehicle 0002 to the block section 2WT(N). By doing so, after the vehicle 0001 passes through 2WT(R) and the connection boundary g, the vehicle 0002 returns to the block section 4T again and can reserve the block section 2WT(R) in accordance with the route direction D2.

Second Embodiment

Figure 6:
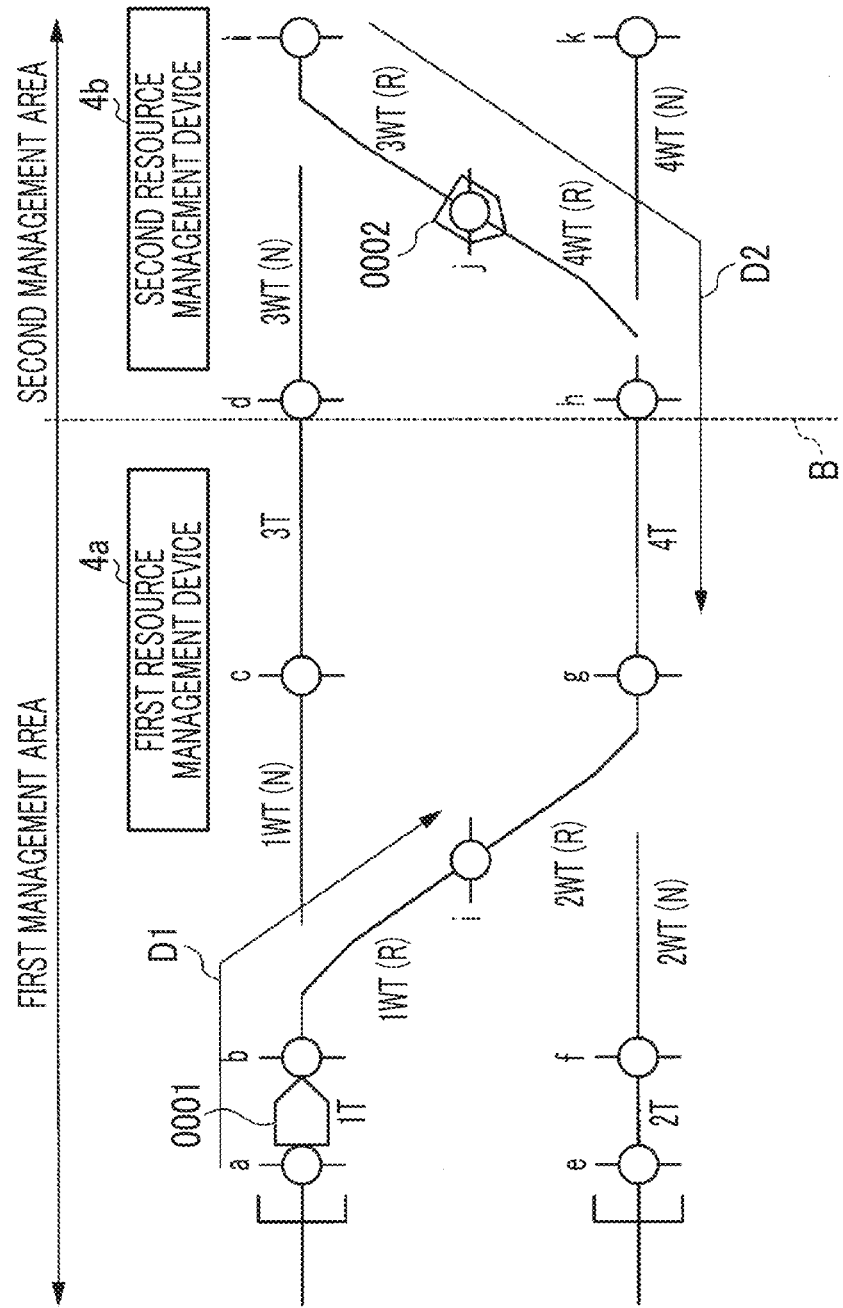
FIG. 6 is a diagram illustrating an installation state of the resource management device according to a second embodiment.

FIG. 6 is a diagram illustrating the installation state of the resource management device.

For example, the track on which the vehicle 1 travels includes block sections in which the vehicle 1 performs normal operation. A first management area having a large operation amount and a second management area such as a vehicle yard having a smaller operation amount than the first management area are disposed in the track. The second management area may be an area other than the vehicle yard. The first management area and the second management area may be set in advance by the operation manager. A vehicle positioned in each block section in the first management area communicates with a first resource management device 4a. A vehicle positioned in each block section in the second management area communicates with a second resource management device 4b. The first resource management device 4a performs the same process as the process described in the first embodiment. The second resource management device 4b controls the operation of the vehicle by performing a different process from the process described in the first embodiment.

Specifically, in the process of reserving the block section based on the reservation request, the second resource management device 4b reserves the block section without using information of the connection boundaries unlike the first embodiment. Accordingly, by not performing the function of the opposition protection, that is, the process of disposing a block section not reservable by vehicles between block sections reserved by the vehicles traveling in opposition to each other, the traveling of the vehicles can be controlled with a higher degree of freedom in the track belonging to the second management area.

Figure 7:
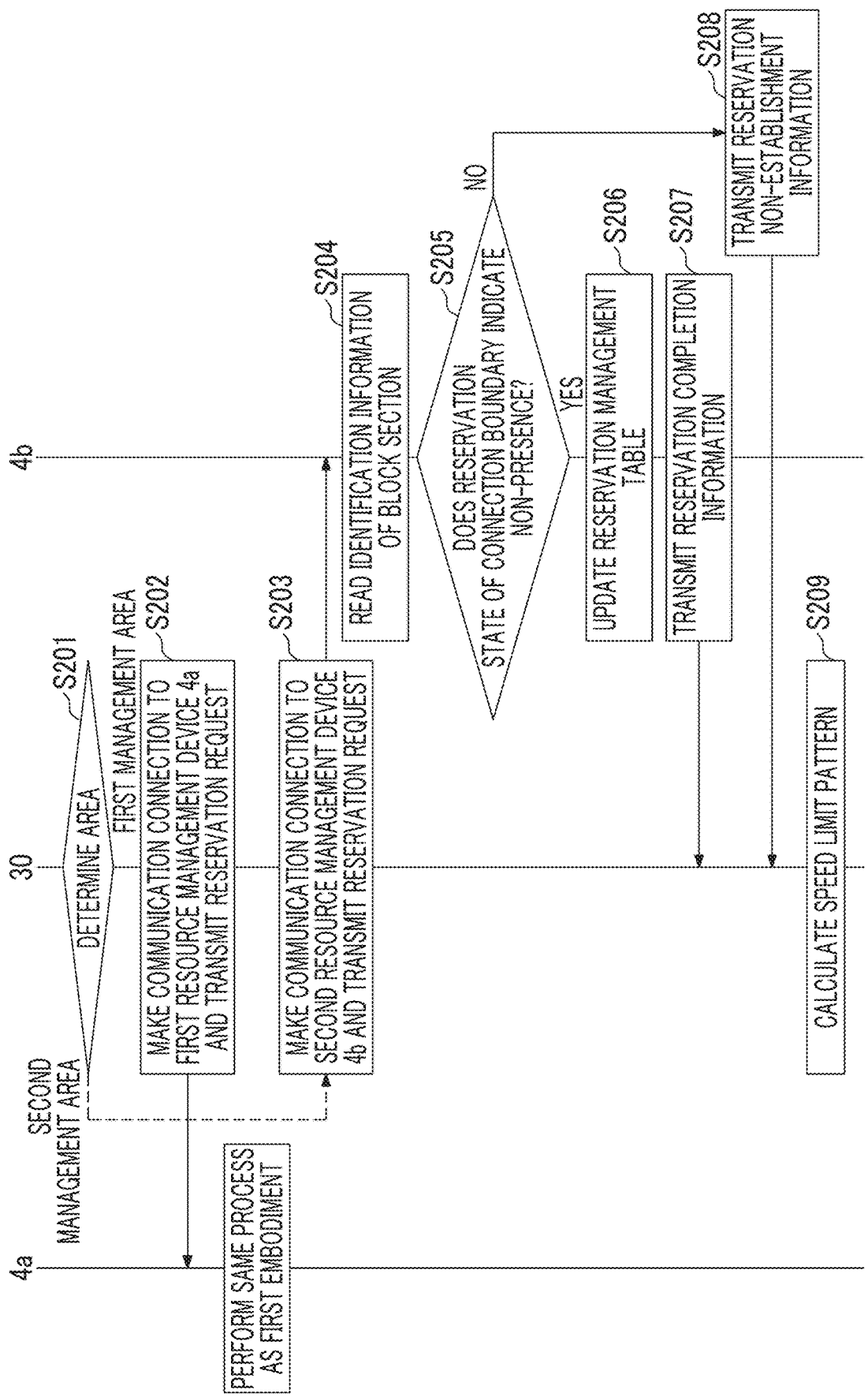
FIG. 7 is a diagram illustrating a process flow of a vehicle control system according to the second embodiment.

FIG. 7 is a diagram illustrating a process flow of a vehicle control system according to a second embodiment.

The reservation request unit 32 of the traveling management device 30 determines whether the vehicle 1 in which the traveling management device 30 is mounted is positioned in the block section belonging to the first management area or is positioned in the block section belonging to the second management area (step S201). In a case where the vehicle 1 is positioned in the block section belonging to the first management area, the reservation request unit 32 determines to make communication connection to the first resource management device 4a. In this case, the reservation request unit 32 makes communication connection to the first resource management device 4a and transmits the reservation request (step S202). The first resource management device 4a performs the same process as the first embodiment. In a case where the vehicle 1 is positioned in the block section belonging to the second management area, the reservation request unit 32 determines to make communication connection to the second resource management device 4b. In this case, the reservation request unit 32 makes communication connection to the second resource management device 4b and transmits the reservation request (step S203).

In a case where the second resource management device 4b receives the reservation request, the reservation management unit 41 of the second resource management device 4b reads the identification information of the block sections included in the reservation request (step S204). Based on the identification information of the block sections read from the reservation request, the reservation management unit 41 reads the reservation states of the block sections from the block section reservation management table 401 and determines whether or not reservation is not present (step S205). In a case where the reservation states of the block sections included in the reservation request indicate that reservation is not present, the block section reservation management table 401 is updated such that the reservation holder identification information corresponding to the identification information of the block sections is set with the identification information of the vehicle transmitting the reservation request (step S206). The second resource management device 4b does not store the connection boundary reservation management table 402. The second resource management device 4b does not use information of the connection boundaries for processing. Thus, the second resource management device 4b does not store information of the two connection boundaries in the block section reservation management table 401 illustrated in FIG. 4.

The reservation management unit 41 transmits the reservation completion information based on the reservation request to the in-vehicle signal device 3 of the vehicle transmitting the reservation request (step S207). Alternatively, the reservation management unit 41 transmits information indicating non-establishment of reservation based on the reservation request to the in-vehicle signal device 3 of the vehicle transmitting the reservation request (step S208). The traveling management device 30 calculates the speed limit pattern in the same manner as the first embodiment based on the reservation completion information acquired from the in-vehicle signal device 3 (step S209).

By such a process, the second resource management device 4b performs a reservation process for the vehicle 1 positioned in the second management area based on the reservation request without using the information of the connection boundaries. Accordingly, by causing the second resource management device 4b not to perform the process of disposing a block section not reservable by the vehicles 1 between the block sections reserved by the vehicles 1 traveling in opposition to each other, the traveling of the vehicles can be controlled with a higher degree of freedom in the track belonging to the second management area.

Third Embodiment

Figure 8:
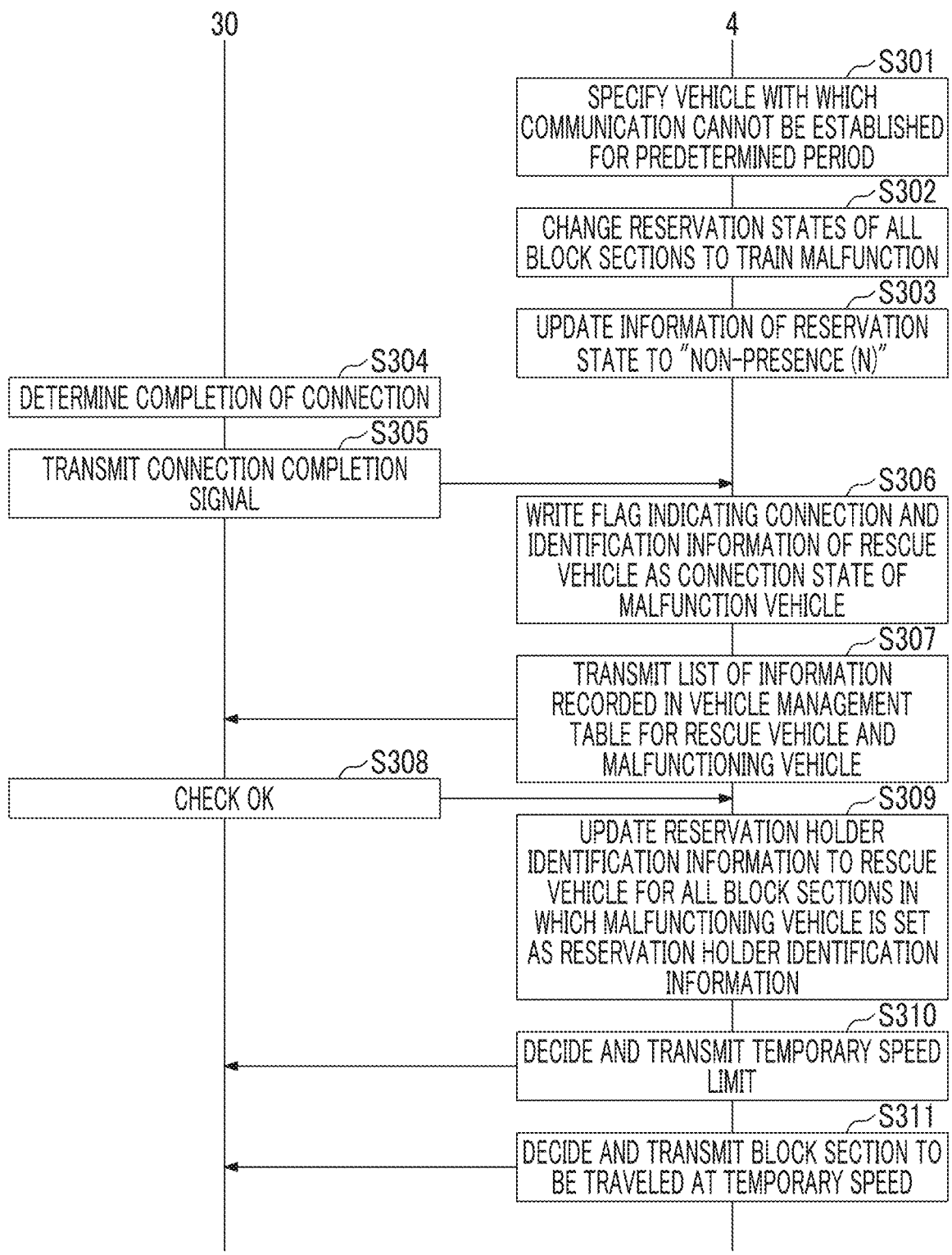
FIG. 8 is a diagram illustrating a process flow of a vehicle control system according to a third embodiment.

FIG. 8 is a diagram illustrating a process flow of a vehicle control system according to a third embodiment.

In a case where the vehicle 1 malfunctions and stops in a certain block section, various communications are performed between the operation manager and an operator of the vehicle 1. A technology for reducing the effort of the operation manager and the operator by removing such a complex work is needed. Therefore, in the present embodiment, a rescue operation for the malfunctioning vehicle 1 is performed in cooperation between the resource management device 4 and the traveling management device 30. Hereinafter, a process in such a case will be described.

The resource management device 4 periodically communicates with the traveling management device 30. In a case where the reservation management unit 41 of the resource management device 4 cannot establish communication with the traveling management device 30 for a predetermined period, the reservation management unit 41 specifies the vehicle 1 in which the in-vehicle signal device 3 is disposed (step S301). Then, the reservation management unit 41 processes the specified vehicle 1 as a malfunctioning vehicle 1a. In a case where the reservation management unit 41 specifies the malfunctioning vehicle 1a, the reservation management unit 41 specifies the block sections for which the reservation holder identification information is recorded as the identification information of the malfunctioning vehicle 1a in the block section reservation management table 401. The reservation management unit 41 changes the reservation states of all of the specified block sections to a train malfunction (step S302).

The reservation management unit 41 of the resource management device 4 periodically receives positional information from the traveling management device 30 and determines the block section in which the vehicle 1 is positioned based on the positional information. After this determination, the reservation management unit 41 changes the line presence state of the block section in which the vehicle 1 is positioned to "presence".

The reservation management unit 41 specifies identification information of all connection boundaries disposed in the block sections of which the reservation states are changed to the train malfunction. The reservation management unit 41 updates information of the reservation states recorded in the connection boundary reservation management table 402 from "presence (Y)" to "non-presence (N)" in correspondence with the identification information of the connection boundaries (step S303). Accordingly, a block section that cannot be reserved is not disposed between the malfunctioning vehicle 1a and another vehicle such as a rescue vehicle 1b. Thus, control for enabling the rescue vehicle 1b or the like to approach to the malfunctioning vehicle 1a can be performed. The control unit 45 of the resource management device 4 may transmit a malfunctioning vehicle occurrence signal for notification of the occurrence of the malfunctioning vehicle 1a to the operation management device 2. The malfunctioning vehicle occurrence signal may include the identification information of the malfunctioning vehicle 1a, the identification information of the block sections reserved by the vehicle, and the like.

In a case where the operation management device 2 receives the malfunctioning vehicle occurrence signal, the operation management device 2 outputs alert information to a monitor or the like. Accordingly, the operation manager or the like requests the rescue vehicle 1b to perform a rescue. The operation management device 2 transfers the malfunctioning vehicle occurrence signal to the rescue vehicle 1b. Accordingly, the rescue vehicle 1b is notified of the identification information of the malfunctioning vehicle 1a and information of the block sections reserved by the malfunctioning vehicle 1a. By using the information of the block sections, the operator of the rescue vehicle 1b can detect the block section in which the malfunctioning vehicle 1a may be positioned. The operator of the rescue vehicle 1b moves to the vicinity of the block sections reserved by the malfunctioning vehicle 1a. At this point, the traveling management device 30 included in the malfunctioning vehicle 1a makes the reservation request through the same process as the first embodiment. Consequently, the resource management device 4 performs reservation through the same process. The traveling management device 30 of the rescue vehicle 1b performs operation control to the vicinity of the malfunctioning vehicle 1a based on a response from the resource management device 4. The operator may manually designate the traveling block sections and the speed of the rescue vehicle 1b. Since the connection boundaries are not reserved, the rescue vehicle 1b can reserve and travel up to the block section adjacent to the block sections reserved by the malfunctioning vehicle 1a.

The rescue vehicle 1b can travel through the block sections of which the reservation states are updated to the train malfunction by the reservation request of the malfunctioning vehicle 1a. The control unit 35 of the traveling management device 30 included in the rescue vehicle 1b determines whether or not the vehicle that includes the host device is the rescue vehicle 1b based on the identification information of the vehicle stored in the host device. The control unit 35 determines whether or not the block section in which the host vehicle is currently positioned is the block section adjacent to the block sections reserved by the malfunctioning vehicle 1a based on positional information that is obtained from the function of a GPS or the like mounted in the host vehicle. In a case where the control unit 35 determines that the host vehicle is the rescue vehicle 1b and is positioned in the block section adjacent to the block sections reserved by the malfunctioning vehicle 1a, the control unit 35 transitions to a rescue mode. The rescue mode is a traveling mode in which traveling and reverse traveling are enabled in only the block sections of which the reservation states are set as the train malfunction and the block section that is adjacent to the block sections of the train malfunction and in which the rescue vehicle 1b is positioned.

The operator of the rescue vehicle 1b manually operates the rescue vehicle 1b that transitions to the rescue mode. Specifically, the operator sets the route direction and the speed by operating an operation unit and operates the rescue vehicle 1b. The upper limit of the speed of the vehicle in the rescue mode may be controlled by the traveling control unit 320. The operator causes the rescue vehicle 1b to approach to the malfunctioning vehicle 1a and connects the malfunctioning vehicle 1a to the rescue vehicle 1b. A communication cable is disposed in each of the malfunctioning vehicle 1a and the rescue vehicle 1b. By connecting the vehicles to each other, communication connection between the traveling management device 30 of the malfunctioning vehicle 1a and the traveling management device 30 of the rescue vehicle 1b is made. The communication connection between the malfunctioning vehicle 1a and the rescue vehicle 1b may be made by wireless communication.

The operator of each of the malfunctioning vehicle 1a and the rescue vehicle 1b restarts the in-vehicle signal device 3 and the traveling management device 30 of the host vehicle. At the time of the restart, the malfunctioning vehicle 1a and the rescue vehicle 1b enter a state where communication with the operation management device 2 and the resource management device 4 is temporarily unavailable. At this point, the resource management device 4 deletes information of the rescue vehicle 1b and the malfunctioning vehicle 1a from the block section reservation management table 401 and the connection boundary reservation management table 402. The traveling management device 30 of the malfunctioning vehicle 1a and the traveling management device 30 of the rescue vehicle 1b start communicating with each other after the restart. Each traveling management device 30 recognizes that one vehicle is formed by connecting the vehicles. For example, the traveling management device 30 of the rescue vehicle 1b is set as the traveling management device 30 that operates as a main device (master).

FIG. 9 is a diagram illustrating a vehicle management table.

The resource management device 4 stores the vehicle management table illustrated in FIG. 9 in the storage unit 47. In the vehicle management table, the identification information of the vehicle, a communication state, a connection state, and a state confirmation flag are recorded in association. The communication state is information indicating whether or not the resource management device 4 can communicate with the vehicle. In a case where communication is available, the communication state is changed to a flag indicating normality. In a case where communication is unavailable, the communication state is changed to a flag indicating abnormality. The connection state is information indicating a connection state with another vehicle. In a case where connection is made to another vehicle, the identification information of the vehicle as a connection destination is stored in the connection state. The state confirmation flag is a flag indicating whether or not each information indicating the state of the associated vehicle is confirmed.

In the traveling management device 30 of the rescue vehicle 1b, the control unit 35 determines that the connection is completed (step S304). Then, the control unit of the traveling management device 30 transmits a connection completion signal including the identification information of the host vehicle, the identification information of the malfunctioning vehicle 1a, the current position, and the like to the resource management device 4 (step S305). In a case where the reservation management unit 41 of the resource management device 4 receives the connection completion signal, the reservation management unit 41 writes a flag indicating connection and the identification information of the connected rescue vehicle 1b in the field of the connection state in association with the identification information of the malfunctioning vehicle 1a in the vehicle management table (step S306). Accordingly, the resource management device 4 stores the connection between the malfunctioning vehicle 1a and the rescue vehicle 1b. The reservation management unit 41 of the resource management device 4 manages the malfunctioning vehicle 1a as one vehicle showing the identification information of the rescue vehicle 1b. In a stage where the connection completion signal is received, the reservation management unit 41 of the resource management device 4 updates the state confirmation flag recorded in the vehicle management table in association with the identification information of the malfunctioning vehicle 1a and the identification information of the rescue vehicle 1b to a flag indicating non-confirmation.

The reservation management unit 41 of the resource management device 4 may specify the block sections based on positional information included in the connection completion signal. At this point, the reservation management unit 41 of the resource management device 4 may rewrite the reservation holder identification information recorded in the block section reservation management table 401 in association with the identification information of the block sections to the identification information of the vehicles indicating the malfunctioning vehicle 1a and the rescue vehicle 1b. Accordingly, the block sections in which the malfunctioning vehicle 1a and the rescue vehicle 1b are present can be recorded.

The reservation management unit 41 specifies the address of the traveling management device 30 of the malfunctioning vehicle 1a using the identification information of the malfunctioning vehicle 1a. The reservation management unit 41 transmits a list of current information recorded in the vehicle management table with respect to the rescue vehicle 1b and the malfunctioning vehicle 1a to the address (step S307). The traveling management device 30 of the malfunctioning vehicle 1a displays the list on a monitor or the like. The operator of the malfunctioning vehicle 1a checks the list and inputs a check OK operation into the traveling management device 30. In the traveling management device 30 of the malfunctioning vehicle 1a, the control unit 35 transmits a signal indicating check OK to the resource management device (step S308). The reservation management unit 41 of the resource management device 4 rewrites the state confirmation flag recorded in the vehicle management table in association with the identification information of the malfunctioning vehicle 1a and the rescue vehicle 1b from non-confirmation to confirmation. In addition, the reservation management unit 41 updates the reservation holder identification information to the identification information of the rescue vehicle 1b for all block sections in which the identification information of the malfunctioning vehicle 1a is set as the reservation holder identification information (step S309). Accordingly, the rescue vehicle 1b can reserve the block sections that are reserved by the malfunctioning vehicle 1a ahead of the accident.

The operator or the operation manager of the malfunctioning vehicle 1a and the rescue vehicle 1b decides a temporary speed limit of the connected vehicle and block sections to be traveled at the speed. This decision may be automatically made by the traveling management device 30 or the resource management device 4. For example, the traveling management device 30 or the resource management device 4 decides a predetermined temporary speed limit. In a case where the resource management device 4 decides the temporary speed limit, the control unit 45 of the resource management device 4 transmits information of the temporary speed limit to the traveling management device 30 (step S310). In addition, the traveling management device 30 or the resource management device 4 decides the block sections reserved by the malfunctioning vehicle 1a, one or a plurality of consecutive block sections that are connected to the block sections and are traveled by the rescue vehicle 1b for the rescue, and the like as the block sections that can be traveled at the temporary speed limit. The resource management device 4 transmits information of the block sections to be traveled at the temporary speed limit to the traveling management device 30 (step S311). In the traveling management device 30, the information of the temporary speed limit and the block sections is registered, and the traveling control unit 320 uses the information in traveling control.

The reservation management unit 41 of the resource management device 4 changes the reservation states of the block sections to be traveled by the connected vehicle of the malfunctioning vehicle 1a and the rescue vehicle 1b at the temporary speed limit to "undefined". Then, the operator of the rescue vehicle 1b causes the rescue vehicle 1b to which the malfunctioning vehicle 1a is connected to travel in an in-yard traveling mode based on the temporary speed limit. For example, the in-yard traveling mode is a mode in which traveling is performed at a speed of 4 km/h. In the case of exiting from the block section in which traveling is performed at the temporary speed limit, the resource management device 4 and the traveling management device 30 change to an automatic operation mode in cooperation and reserve the block sections through the same process as the first embodiment. The operator of the rescue vehicle 1b inputs a setting and the like of the block sections for evacuating the malfunctioning vehicle 1a to the vehicle yard into the traveling management device 30. Accordingly, the malfunctioning vehicle 1a can be evacuated to the vehicle yard.

According to the process thus far, the rescue of the malfunctioning vehicle 1a using the rescue vehicle 1b and evacuation to a predetermined position can be easily performed using the reservation management table and the vehicle management table. Any one or a plurality of processes performed by each device according to the third embodiment may be manually performed by the operator or the operation manager.

The in-vehicle signal device 3, the traveling management device 30, and the resource management device 4 include a computer system. Each process described above is stored in a computer-readable recording medium in a program format. The processes are performed by causing a computer to read and execute the program. The computer-readable recording medium refers to a magnetic disk, a magneto-optical disc, a CD-ROM, a DVD-ROM, a semiconductor memory, or the like. The computer program may be delivered to the computer through a communication line, and the computer receiving the delivery may execute the program.

The program may be a program that implements a part of the above functions. The program may be a so-called difference file (difference program) that can implement the above functions in combination with a program already recorded in the computer system.

INDUSTRIAL APPLICABILITY

The present invention relates to a vehicle control system, a resource management apparatus, a vehicle control method, and a program.

The invention claimed is:

1. A vehicle control system comprising:
a traveling management device including a reservation request unit that transmits a reservation request for a block section of a reservation target to a resource management device among a plurality of block sections included in a track traveled by a vehicle based on track information indicating the plurality of block sections constituting the track of the vehicle and a connection relationship between the block sections; and
the resource management device including a reservation management unit that records all of block sections of the reservation target indicated by the reservation request and each of connection boundaries between all of the block sections of the reservation target and another block section on an advancing direction of the vehicle transmitting the reservation request in a first reservation management table as a reserved target of the vehicle transmitting the reservation request in a case where each of the block sections of the reservation target indicated by the reservation request is not reserved in the first reservation management table by a vehicle other than the vehicle transmitting the reservation request at a time of reception of the reservation request.

2. The vehicle control system according to claim 1, wherein in a case where one of the connection boundaries is recorded in the first reservation management table as the reserved target, the reservation management unit of the resource management device rejects the reservation request for a block section having the one connection boundary.

3. The vehicle control system according to claim 1, wherein in a case where one of the connection boundaries that is positioned in the advancing direction of the vehicle between connection boundaries at both ends of one of the block sections of the reservation request from the vehicle is recorded in the first reservation management table as the reserved target, the reservation management unit of the resource management device rejects the reservation request for a block section having the one connection boundary.

4. The vehicle control system according to claim 1, wherein the resource management device includes
a first resource management device that performs reservation management of the block sections using the first reservation management table, and
a second resource management device that records the block sections of the reservation target indicated by the reservation request in a second reservation management table as the reserved target of the vehicle transmitting the reservation request without recording the connection boundaries disposed in the block sections of the reservation target indicated by the reservation request as the reserved target and performs reservation management of the block sections using the second reservation management table in a case where each of the block sections of the reservation target indicated by the reservation request is not reserved by the vehicle other than the vehicle transmitting the reservation request at the time of reception of the reservation request, and
the reservation request unit of the traveling management device transmits the reservation request to any of the first resource management device or the second resource management device disposed in correspondence with a position of the vehicle traveling on the track.

5. The vehicle control system according to claim 4, wherein
the first resource management device performs a process based on a reservation request for each block section installed in a first management area, and
the second resource management device performs a process based on a reservation request for each block section installed in a second management area.

6. The vehicle control system according to claim 1, wherein
the first reservation management table stores identification information of one of the block sections in association with a reservation state of the one block section,
the resource management device includes a malfunction detection unit that detects a malfunction of the vehicle, and
in a case where the malfunction of the vehicle is detected, the reservation management unit of the resource management device updates the reservation state of the one block section reserved by the vehicle to a train malfunction and deletes a recording of the first reservation management table for a corresponding connection boundary of the connection boundaries as the reserved target.

7. The vehicle control system according to claim 6, wherein the resource management device records a block section reserved by the vehicle having the detected malfunction in the first reservation management table as a block section of a reserved target reserved by a rescue vehicle connected to a malfunctioning vehicle.

8. A resource management device included in a vehicle control system, comprising:
a reservation management unit that
makes communication connection to a traveling management device including a reservation request unit that transmits a reservation request for a block section of a reservation target to a resource management device among a plurality of block sections included in a track traveled by a vehicle based on track information indicating the plurality of block sections constituting the track of the vehicle and a connection relationship between the block sections, and records all of block sections of the reservation target indicated by the reservation request and each of connection boundaries between all of the block sections of the reservation target and another block section on an advancing direction of the vehicle transmitting the reservation request in a first reservation management table as a reserved target of the vehicle transmitting the reservation request in a case where each of the block sections of the reservation target indicated by the reservation request is not reserved in the first reservation management table by a vehicle other than the vehicle transmitting the reservation request at a time of reception of the reservation request.

9. The resource management device according to claim 8, wherein in a case where one of the connection boundaries that is positioned in the advancing direction of the vehicle between connection boundaries at both ends of the block section of the reservation request from the vehicle is recorded in the first reservation management table as the reserved target, the reservation management unit rejects the reservation request for a block section having the one connection boundary.

10. The resource management device according to claim 9, wherein the first reservation management table stores identification information of one of the block sections in association with a reservation state of the one block section, the resource management device includes a malfunction detection unit that detects a malfunction of the vehicle, and in a case where the malfunction of the vehicle is detected, the reservation management unit of the resource management device updates the reservation state of the one block section reserved by the vehicle to a train malfunction and deletes a recording of the first reservation management table for a corresponding connection boundary of the connection boundaries as the reserved target.

11. The resource management device according to claim 10, wherein the reservation management unit records a block section reserved by the vehicle having the detected malfunction in the first reservation management table as a block section of a reserved target reserved by a rescue vehicle connected to a malfunctioning vehicle.

12. A vehicle control method comprising:

making communication connection to a traveling management device including a reservation request unit that transmits a reservation request for a block section of a reservation target to a resource management device among a plurality of block sections included in a track traveled by a vehicle based on track information indicating the plurality of block sections constituting the track of the vehicle and a connection relationship between the block sections; and recording all of block sections of the reservation target indicated by the reservation request and each of connection boundaries between all of the block sections of the reservation target and another block section on an advancing direction of the vehicle transmitting the reservation request in a first reservation management table as a reserved target of the vehicle transmitting the reservation request in a case where each of the block sections of the reservation target indicated by the reservation request is not reserved in the first reservation management table by a vehicle other than the vehicle transmitting the reservation request at a time of reception of the reservation request.

13. The vehicle control method according to claim 12, wherein in a case where one of the connection boundaries that is positioned in the advancing direction of the vehicle between connection boundaries at both ends of the block section of the reservation request from the vehicle is recorded in the first reservation management table as the reserved target, the reservation request for a block section having the one connection boundary is rejected.

14. The vehicle control method according to claim 13, wherein the first reservation management table stores identification information of one of the block sections in association with a reservation state of the one block section, a malfunction of the vehicle is detected, and in a case where the malfunction of the vehicle is detected, the resource management device updates the reservation state of the one block section reserved by the vehicle to a train malfunction and deletes a recording of the reservation management table for a corresponding connection boundary of the connection boundaries as the reserved target.

15. The vehicle control method according to claim 14, wherein a block section reserved by the vehicle having the detected malfunction is recorded in the first reservation management table as a block section of a reserved target reserved by a rescue vehicle connected to a malfunctioning vehicle.

16. A vehicle control method comprising:

causing a traveling management device to transmit a reservation request for a block section of a reservation target to a resource management device among a plurality of block sections included in a track traveled by a vehicle based on track information indicating the plurality of block sections constituting the track of the vehicle and a connection relationship between the block sections; and causing the resource management device to record all of block sections of the reservation target indicated by the reservation request and each of connection boundaries between all of the block sections of the reservation target and another block section on an advancing direction of the vehicle transmitting the reservation request in a first reservation management table as a reserved target of the vehicle transmitting the reservation request in a case where each of the block sections of the reservation target indicated by the reservation request is not reserved in the first reservation management table by a vehicle other than the vehicle transmitting the reservation request at a time of reception of the reservation request.

17. A non-transitory computer-readable storage medium having stored therein a program causing a computer to implement:

making communication connection to a traveling management device including a reservation request unit that transmits a reservation request for a block section of a reservation target to a resource management device among a plurality of block sections included in a track traveled by a vehicle based on track information indicating the plurality of block sections constituting the track of the vehicle and a connection relationship between the block sections; and recording all of block sections of the reservation target indicated by the reservation request and each of connection boundaries between all of the block sections of the reservation target and another block section on an advancing direction of the vehicle transmitting the reservation request in a first reservation management table as a reserved target of the vehicle transmitting the reservation request in a case where each of the block sections of the reservation target indicated by the reservation request is not reserved in the first reservation management table by a vehicle other than the vehicle transmitting the reservation request at a time of reception of the reservation request.

18. The non-transitory computer-readable storage medium according to claim 17, wherein the program further causes the computer to implement:

rejecting the reservation request for a block section having one of the connection in a case where the one connection boundary that is positioned in the advancing direction of the vehicle between connection boundaries at both ends of the block section of the reservation request from the vehicle is recorded in the first reservation management table as the reserved target.

19. The non-transitory computer-readable storage medium according to claim 18, wherein the program further causes the computer to implement:

detecting a malfunction of the vehicle; and updating the reservation state of one of the block sections reserved by the vehicle to a train malfunction and deleting a recording of the first reservation management table for a corresponding connection boundary of the connection boundaries as the reserved target in a case where the malfunction of the vehicle is detected.

20. The non-transitory computer-readable storage medium according to claim 19, wherein the program further causes the computer to implement:

recording a block section reserved by the vehicle having the detected malfunction as a block section of a reserved target reserved by a rescue vehicle connected to the vehicle having the detected malfunction.

\* \* \* \* \*